3,420,598
SCREEN ANIMATOR
Daniel Goss, P.O. Box 1132, Adelaide St. Post Office,
Toronto 1, Ontario, Canada
Filed May 6, 1966, Ser. No. 548,140
U.S. Cl. 350—120                                5 Claims
Int. Cl. G03b 21/56; G03b 21/32

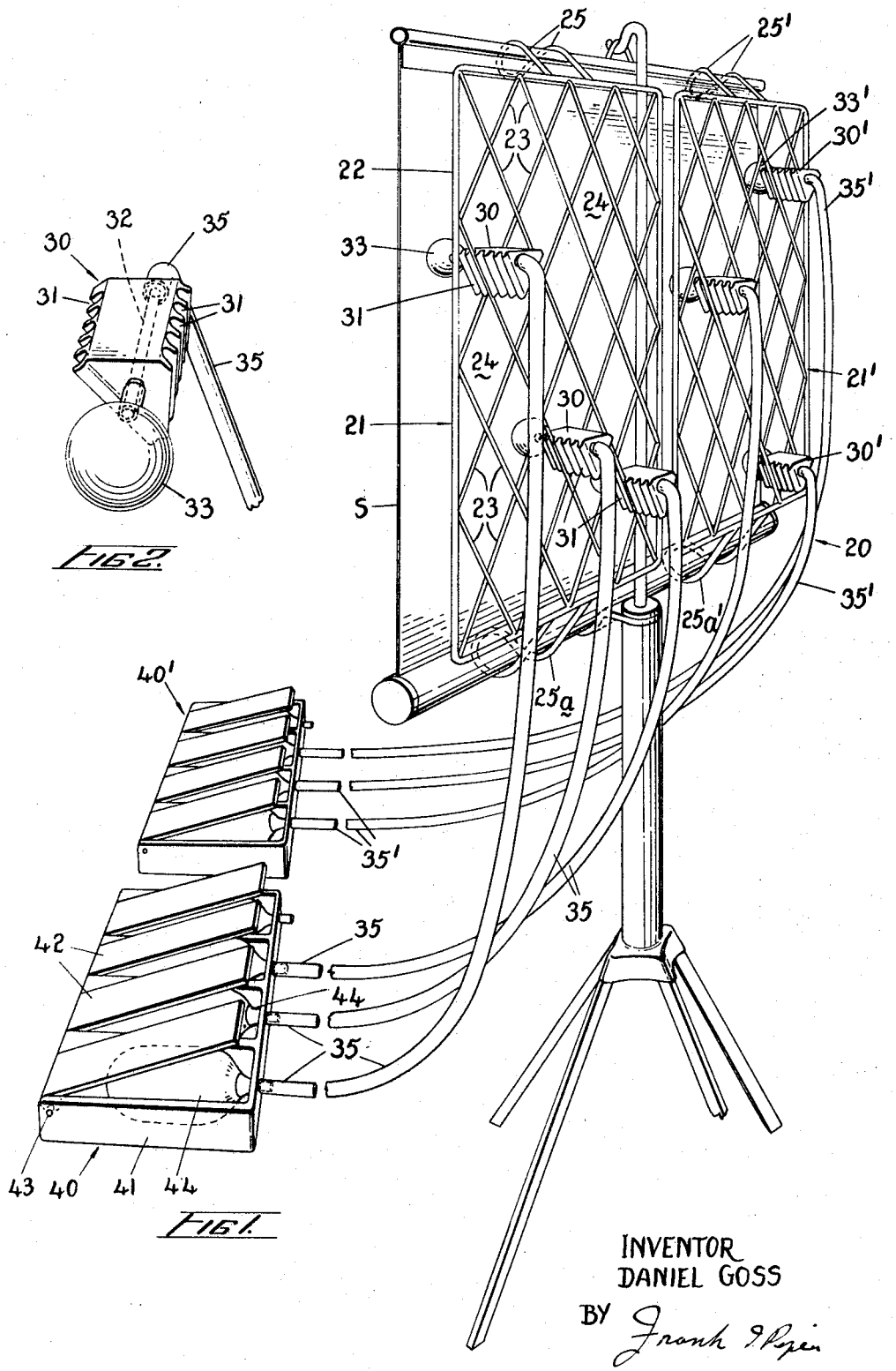

ABSTRACT OF THE DISCLOSURE

A device for animating "still" pictures projected onto a flexible display screen. A plurality of fluid operated actuators are adapted for positioning behind the display screen such that selective extension and retraction of the actuators under fluid pressure permits intermittent deformation of the screen surface from its normal plane. By so deforming selected areas of the screen, apparent animation of the picture projected thereon can be produced.

---

The present invention is directed to an animation device and in particular to a device for selectively deforming a projection screen whereby selected portions of pictures projected onto the screen can be animated.

In the showing of film slides upon a projection screen, it has been found that animation of a "still" picture may be produced by selectively deforming the surface of the screen from its usual surface form. Thus by deforming selected areas of a picture and permitting the area to then revert to its original plane or form, apparent animation of the picture is produced. In this fashion a variety of movements may be simulated. For example, figures on the screen may be animated, water may be made to ripple, or trees to blow in the wind. Also the variable distortion of human or animal figures on the screen can produce entertaining humorous effects.

I have found that a suitable form of actuator may be produced by use of a plurality of inflatable bladders such as balloons suitably positioned in contact with the obverse face of the screen in question and connected to selectively operable fluid pumping means, such as individual foot or hand pumps so that selected ones of the balloons or bladders may be inflated and deflated to provide the desired selected deformation of the viewing surface of the screen.

What I have provided is a screen movement device for use with a projection screen having a flexible display surface, comprising: support frame means to be positioned behind a projection screen in substantially parallel spaced relation therewith; a plurality of extensible actuator means secured to the frame, each having a portion thereof extensible beyond the frame to contact the obverse face of the screen; and means to selectively operate the actuators whereby selected areas of the screen may be deformed.

Certain embodiments of the present invention are described, reference being had to the accompanying drawings wherein:

FIG. 1 is a general view of the device secured behind a standard portable viewing screen; and FIG. 2 is a detail view of a mounting arrangement for an individual actuator.

Referring to FIG. 1 the screen movement device 20 illustrated comprises two support members 21, 21' mounted behind a conventional portable projection screen S. Support members 21, 21' are identical in every respect so that only one will be described in detail hereinbelow.

Support frame means 21 is formed of spot welded wire and having a generally rectangular peripheral member 22 and a plurality of diagonally disposed cross members 23 which define numerous diamond-shaped openings 24.

The frame 21 is mounted behind a conventional portable projection screen S in substantially parallel spaced relation therewith. The support means 21 is held in position by means of convoluted hangers 25, 25a attached at the upper and lower edges of frame 21 and adapted to firmly grasp the upper and lower portions of the screen without the need for extraneous attachments. One or more supports 21, 21', etc., can be readily attached to the screen by positioning hangers 25, 25a and 25', 25a" over the upper and lower portions of the screen then extending the screen and clamping it in the extended position with sufficient pressure on hangers 25, 25a to hold the supports firmly in position. This method of attachment eliminates any tendency of the supports to "yaw" or swing when in use.

A plurality of actuator mounting members 30 are positioned in selected openings 24. The mounting members 30 are formed with a series of grooves 31 which enable them to be adjustably positioned in openings 24 with respect to the obverse face of the screen. In the particular embodiment shown grooves 31 are staggered on opposite sides of the support member, to account for the relative offset in wires 23 on opposite sides of each opening 24. As shown in FIG. 2 each actuator support member 30 has a conduit 32 formed therethrough and is adapted on one side for attachment to an inflatable bladder or balloon 33, and on the other side to a conduit tube 35.

Tube 35 is connected with a fluid pump means 40. Pump means 40 includes a base 41 and a plurality of compressor pedals 42 pivotally mounted thereto by means of a pivot pin 43. A deformable air bottle 44 is positioned beneath each compressor pedal 42 and each is connected through a spout portion of a tube 35. Movement of a pedal 42 compresses a corresponding air bottle 44 so that air is forced through tube 35 to a balloon 33 connected thereto. Expansion on a screen actuator balloon 33 causes it to push against the obverse face of the screen S causing it to be deformed with the degree of deformation depending on the position of the screen actuator support member and the amount of air forced into the balloon from air bottle 44. Since each connected air bottle, tube and actuator balloon form a closed unit, the balloon and bottle will automatically return to the same state of deformation when the pressure is taken off pedals 42. Actuators 33' are connected through tubes 35' to pump unit 40' which is of the same construction as described above.

It will be apparent that the number of actuator balloons and their positions can be varied depending on the desires of the operator. Also the number of pump units and separate wire frame units can be varied for the same or different installations. It is also contemplated that one or more hand-operated air pumps of any appropriate construction may be provided separately or in addition to the foot pumps shown in the drawings.

It will be understood that the invention also contemplates other forms of the actuator support frames 21, 21'. For example, they could advantageously be formed of molded plastic and the openings 24 could be of any suitable shape or configuration that would facilitate simple and economic achievement of the basic purpose of the support frames, which is the support of the actuator balloons in substantially fixed but adjustable relationship with respect to the obverse face of the screen.

It is contemplated that the present invention may be adapted for use with the production of animated motion pictures from still pictures.

While the invention has been described by reference to a selected embodiment, it is to be understood that various changes and modifications may be resorted to as fairly come within the scope of the appended claims.

What I claim is:

1. A screen movement device for use with a projection screen having a flexible display surface, comprising: support frame means to be positioned behind a said screen in substantially parallel spaced relation therewith; a plurality of extensible fluid operated actuator means secured to the frame, each having a portion thereof extensible beyond the frame to contact the obverse face of the screen; and means to selectively operate said actuators whereby selected areas of the screen flexible surface may be deformed.

2. A device as claimed in claim 1 wherein said actuator means includes a body portion extending longitudinally through said support frame means, said device including means to secure the actuator means in selected longitudinal relation with the frame means to provide a desired degree of protuberance of individual actuators.

3. A device as claimed in claim 1 wherein said actuator operating means includes fluid compression means connected with the actuators whereby selected ones of said actuators may be extended and retracted relative to the support frame means.

4. A device as claimed in claim 3 wherein said actuators comprise inflatable bladder means individually mounted on a said body portion in sealed fluid connection therewith, said fluid compression means including manually operable air pumping means whereby individual bladders may be selectively inflated and deflated in screen deforming motion.

5. A device as claimed in claim 1 wherein said support frame means is formed with a convoluted retaining means on the upper and lower edges, said retaining means being adapted to grasp the upper and lower portion of an extensible projection screen such that said support frame means can be secured in position by clamping the projection screen in an extended position with the upper and lower portions thereof in firm contact with the retaining means.

References Cited

UNITED STATES PATENTS 1,698,178   1/1929   Van Devanter _____ 352—52

JULIA E. COINER, *Primary Examiner.*

U.S. Cl. X.R.

352—52, 43, 87, 88